Oct. 28, 1952 — H. M. EDMUNDS — 2,615,251
AXONOMETRIC DRAWING DEVICE
Filed Dec. 16, 1950 — 2 SHEETS—SHEET 1
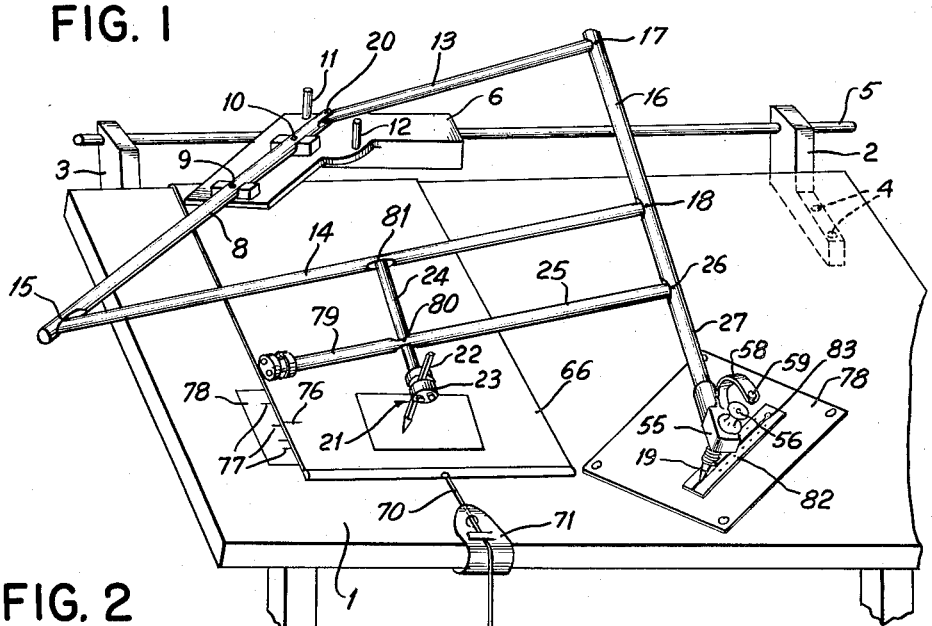
FIG. 1
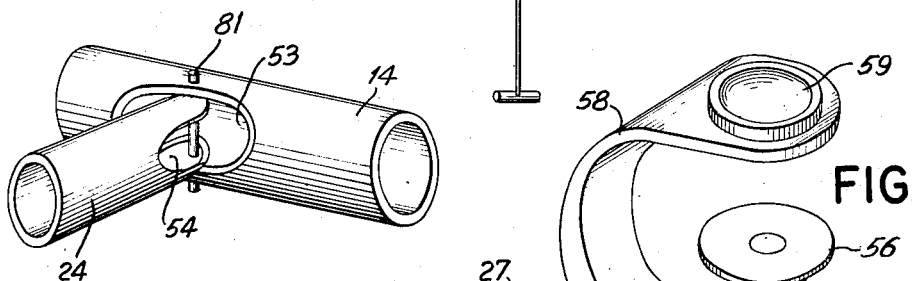
FIG. 2
FIG. 3
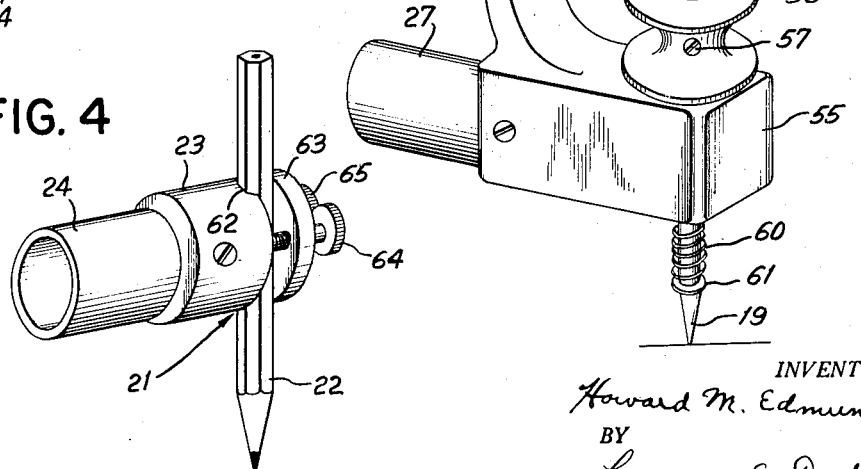
FIG. 4
INVENTOR.
Howard M. Edmunds
BY
Lyman E. Dodge
ATTORNEY.

Oct. 28, 1952 H. M. EDMUNDS 2,615,251
AXONOMETRIC DRAWING DEVICE
Filed Dec. 16, 1950 2 SHEETS—SHEET 2

INVENTOR.
Howard M. Edmunds
BY
Lyman E. Dodge
ATTORNEY.

Patented Oct. 28, 1952

2,615,251

UNITED STATES PATENT OFFICE 2,615,251

AXONOMETRIC DRAWING DEVICE

Howard M. Edmunds, New York, N. Y.

Application December 16, 1950, Serial No. 201,147

4 Claims. (Cl. 33—25)

This invention relates to a reproducing device particularly a device for reproducing a plane figure and more especially for reproducing an orthographic projection as an axonometric projection or drawing.

A principal object of this invention is to produce a device for reproducing a plane figure, the reproduction being the same dimensions as the original figure along one set of parallel lines, a predetermined ratio of the dimensions of the original figure along a set of parallel lines at a right angle to the first mentioned set and the dimensions of the original figure reproduced in proportion to the components of the two directions contained in directions intermediate the two first mentioned directions.

Other objects and advantages will appear as the description of the particular physical embodiment selected to illustrate the invention progresses and the novel features will be particularly pointed out in the appended claims.

Figure 5:
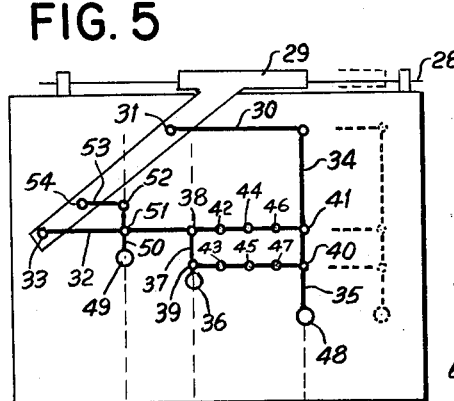
Figure 6:
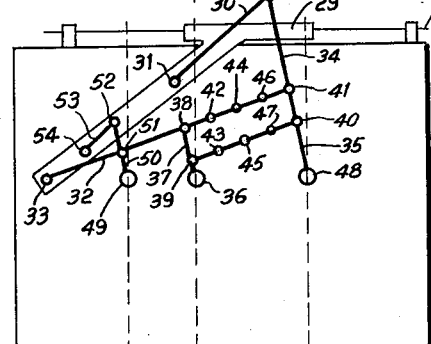
Figure 8:
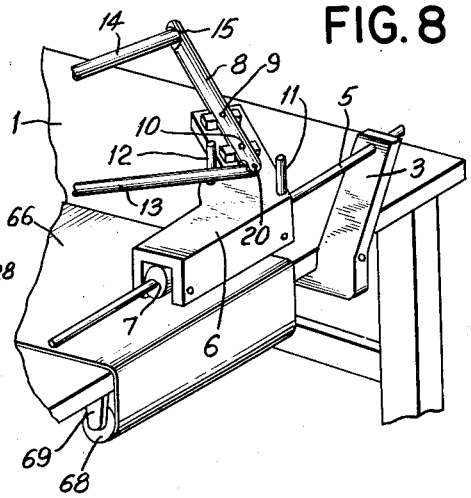
Figure 7:
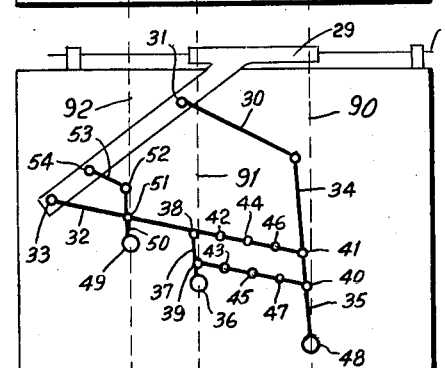
Figure 9:
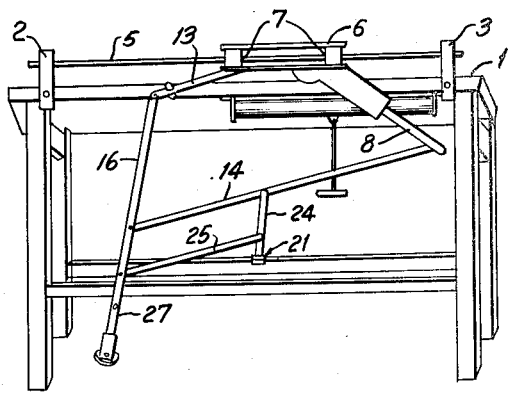
Figure 10:
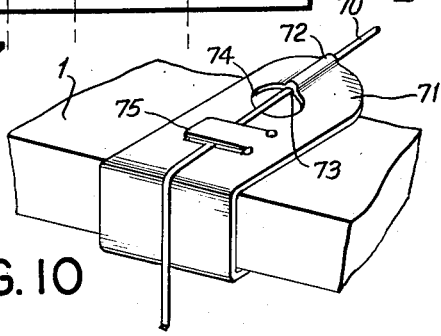

In describing the invention in detail and the particular physical embodiment selected to illustrate the invention, reference will be had to the accompanying drawings and the several views thereon, in which like characters of reference designate like parts throughout the several views, and in which:

Figure 1 is a perspective view illustrating a device embodying my invention; Fig. 2 is an isometric view illustrating a joint used in my invention; Fig. 3 is a perspective view illustrating a manual operable member used in my invention; Fig. 4 is a perspective view illustrating a marking device holder used in my invention; Fig. 5 is a plan view illustrating an alternative form of linkage involving my invention; Fig. 6 is a plan view similar to Fig. 5 illustrating another position of the movable parts of the device as shown by Fig. 5; Fig. 7 is another view similar to Fig. 5 showing a still further positioning of the parts of the device as shown by Fig. 5; Fig. 8 is a fragmentary perspective view of a rear portion of the device as shown by Fig. 1, particularly illustrating a movable member for supporting material upon which to produce an axonometric drawing; Fig. 9 is a rear elevational view of my invention turned to a position down back of a drafting board; Fig. 10 is a perspective view of a moving and holding means connected with the movable drawing surface of my invention.

Those acquainted with the art of drawing and, perhaps more fully, those acquainted with and required to interpret drawings are well aware that no drawing depicts an object of three dimensions which may be as readily visualized as a true perspective drawing.

It is also well known that the production of a true perspective drawing of an object is a time-consuming and expensive task and requires very specially trained draftsmen.

In order to somewhat approach the virtues of a true perspective drawing and at the same time avoid the expense thereof, many have turned to what are known as axonometric drawings of which the one best known is that known as an isometric drawing. Axonometric drawings, and particularly isometric drawings are generally quite sufficient to enable the ordinary shop workman to visualize an object which he is directed to make from information obtained from the drawings alone. The same workman who would find a very considerable difficulty, if not an impossibility, in correctly interpreting and visualizing even the very best drawing composed of orthographic views, readily visualizes an object pictorially illustrated by a good axonometric drawing, especially a good isometric drawing.

A great difficulty in making isometric views is the necessity for substituting ellipses in the isometric views for the true circles of the orthographic projections.

My invention fundamentally is a device by which the circles of orthographic projections may be quickly and successfully transformed into the necessary ellipses of the isometric view depicting the same object as the orthographic views.

The fundamental requisite for a device for reproducing such portions of the orthographic projections as circles, in the isometric view, as ellipses, is that the device will reproduce the dimensions of the plane figures in the isometric view along one set of parallel lines as the same dimensions as the figures in the orthographic views, but will reproduce these same figures in the isometric view along parallel lines at a right angle to the first mentioned parallel lines not as equal to the dimensions of the orthographic view, but diminished. This diminution may be of various ratios. The one commonly required, that is, the one for an isometric view would be a ratio of 1 to 0.577. The other axonometric drawings would require a different ratio. A preferred device would be one which would be adjustable to give the ratio desired. My invention provides such a device.

A device embodying my invention is characterized by the fact that it has a stylus or tracer point and a marker point, and the stylus or tracer point is used to trace the lines of an orthographic projection or plane figure which is to be reproduced, and while the tracer point is so doing, the marker point is producing the reproduction on a drawing surface. The more particular characteristics of my invention are that when the tracer point and the marker point are so used, and the tracer point is moved along a set of parallel lines and the marker point moves equally and bodily therewith, but if the tracer point is moved along a set of parallels at a right angle to the first set of parallels, then the marker point also moves along those parallels, but not in an equal amount to the tracer point and, if the tracer point is moved in any direction intermediate the said two first mentioned directions, then the marker point will move in accordance with the proportion of the components of the two sets in the given direction.

The device of my invention finds its greatest usefulness as an aid in the making of axonometric drawings, particularly isometric, although it is also independently useful for the making of ellipses, that is, as an ellipsograph.

A particular preferred embodiment of my invention is illustrated in Fig. 1 in connection with a conventional drawing surface. The conventional drawing surface is shown as the top plane surface 1 of a drafting table.

In order to support my reproducing device in the most favorable manner, I prefer to place brackets 2 and 3 so that they may be attached under the table and, preferably, project above the table therefore so as not to interfere with anything else on the top of the table. They may be secured in any suitable or appropriate manner as by screws in the through orifices 4.

The brackets 2 and 3 are used to support what I have called an elongated support 5. This elongated support 5 may take many forms, but I prefer to make it in the form of a cylindrical rod.

On the elongated support 5, I position a member 6. This member 6 receives the support 5 by receiving it in orifices as 7, best shown in Figs. 8 and 9. The member 6 so fits the support 5 that it is movable freely therealong and rotatable thereabout. Any suitable or appropriate means may be used for securing a frictionless contact between member 6 and the support 5.

The member 6 includes either integrally formed therewith or attached thereto, the rod or link 8. This rod or link 8, if made from a separate piece, may be attached to member 6 in any suitable or appropriate manner as by rivets 9 and 10.

The member 6 also carries limiting means. This limiting means is preferably in the form of upstanding pins as 11 and 12 and serves to limit the movement of a rod 13 which is articulated or pivoted at 20 to the member 8.

At the other end of member 8 a rod or link 14 is pivoted as at 15.

Links 13 and 14 are connected by a link 16. This link 16 is pivoted to 13 at 17 and to 14 at 18 and extends beyond 14 to support a tracer point 19.

When links 13 and 14 are parallel to each other and to elongated support 5, link 16 is at a right angle to both links 13 and 14.

If tracer point 19 is grasped and moved parallel to elongated support 5, all of the parts hereinbefore just described will move bodily parallel to elongated support 5 regardless of the pivoted position of links 13 and 14, that is, whether link 13 has been pivotally moved to contact 11 or been pivotally moved to contact 12 or in any intermediate position.

If tracer point 19 is grasped, it may be moved by pivoting of 13 and 14 and 16 on pivot points 15, 17, 18 and 20, without any bodily movement of member 6, in a straight line perpendicular to elongated support 5. In fact, if tracer point 19 is moved in a straight line perpendicular to elongated support 5, no bodily movement of member 6 will take place.

Of course tracer point 19 may be moved in any direction intermediate the directions of the set of parallels parallel to elongated support 5, and the set of parallels perpendicular to elongated support 5 by a combination of a bodily movement of member 6 along elongated support 5 and a pivoting movement of links 13, 14 and 16.

When link 14 is parallel to elongated support 5, if a perpendicular is dropped from link 14 to pivot point 20, then a right triangle will be formed by this line, the member 8 between the pivots 15 and 20, and the portion of link 14 intercepted between the perpendicular and pivot point 15. This triangle will not only be a right triangle but the sides will be in proportion to 3, 4 and 5, the 5 being along member 8 and the 4 along link 14.

Various combinations of links will give a linkage which will support a tracer point such as 19, which, when moving in a straight line perpendicular to support 5, will not cause bodily movement of member 6, but I prefer, for one generally useful device, to make the distance from pivot point 15 to pivot point 20, 15 inches; from pivot point 20 to pivot point 17, 12 inches; from pivot point 15 to pivot point 18, 24 inches; from pivot point 17 to pivot point 18, 9 inches; and the extension of link 16 to the center of tracer point 19, 8.25 inches. The above dimensions are given merely as a guide and are not intended to be exclusive because the device may well be built in what may be called different sizes.

In order to reproduce a plane figure which is traced by tracer point 19, it is necessary to have a marking device. My preferred marking device is designated 21 and is shown as a pencil 22 secured in a holder 23.

In order for my marker 21 to reproduce a plane figure traced by tracer 19, it must move simultaneously with tracer 19. In order to produce an axonometric drawing, the marker 21, in accordance with my invention, moves with tracer 19 along lines parallel to elongated support 5 equally with tracer 19, that is, the complete linkage slides by means of member 6 upon elongated support 5. In order to have marking point 21 move at a certain ratio to the distance moved by tracer 19, when 19 is moved either directly perpendicular to the elongated support 5 or in a direction including a component at right angles to the elongated support 5, I position marking point 21 at some point along a line drawn from pivot point 15 to tracer point 19. In accordance with the position of marking point 21 along the said line, the ratio between the actual dimension of the plane figure being traced and the reproduction along lines perpendicular to the elongated support 5 or directions containing a component perpendicular to elongated support 5 will be such as will give the desired foreshortening or, specifically, in the case of an ellipse, the desired ratio between the length of the major axis and the length of the minor axis where the length of the major axis is the same as the diameter of a circle traced by tracer 19.

In order to make marking point 21 partake properly of the motion of tracer 19, that is, move bodily therewith or at a right angle to elongated support 5, it is connected by a pantographic linkage with a pivot point on member 8 and a pivot point on link 16. In Fig. 1, link 14 connects the marking point 21 with pivot point 15 on member 8, and link 25 connnects the marking point 21, with pivot 26 on link 16.

I prefer the linkage connections as shown in Fig. 1, but the same result may be accomplished by the linkage connections as shown in Fig. 5. In this view, the elongated support is designated 28, the sliding member 29. One link, 30, is connected at pivot 31 and another link 32 is connected at pivot 33. A marking point 36 is connected by link 37 with pivot point 38 on line 32 and by pivot 39 and link to pivot point 40 on extension 35. 34 is also connected to 32 by pivot 41.

If the ratio of diminution of the actual dimension of the plane figure perpendicular to elongated support 28 to be made by marker 36 needs to be varied then the link 37 may be connected as shown in the figure or between pivot points 42 and 43, or 44 and 45, or 46 and 47. That is, marking point 36 may be adjustable but in each one of its adjusted positions it lies on the line connecting pivot point 33 to tracer point 48.

Instead of connecting marking point 36 as shown, a marking point 49 may be placed on a link 50 pivoted at 51 and connecting by pivot point 52 to a link 53 pivoted on member 29 at 54. In connection with marking point 49, it should be observed that the marking point is connected to a pivot point 54 on member 29 and by a pivot point through the link 32 to link 34 and extension 35 thereof, that is, to tracer point 48.

A marking point may also be supported on link 79, an extension of link 25, beyond pivot point 80, on link 24, the other end of which is pivoted at 81. In this case the marking point lies in the line from pivot point 15 to tracer point 19.

Fig. 5 shows in dotted lines a position of some of the links when marking point 48 is moved parallel to elongated support 28. Fig. 6 shows the position of the marking point when marking point 48 is moved in a straight line perpendicular to elongated support 28 in an upward direction and Fig. 7 shows the effect when tracer point 48 is moved downwardly. Both Figs. 6 and 7 show that when tracer 48 is moved in a line perpendicular to 28, as line 90, the marking points 36 and 49 also move in straight lines as 91 and 92.

From the hereinbefore given description it is quite obvious that when tracer point 48, as shown in Figs. 5, 6 and 7, or the tracer point 19, as shown in Fig. 1, moves parallel to the elongated support, such as 5 or 28, then the marking points move parallel to the elongated support, but when the tracer point is moved at a right angle to the elongated support, the marking points also move in lines at right angles to the elongated support. It is also obvious that if tracer points, as 48 of Figs. 5, 6 and 7, or 19 of Fig. 1, are moved in any other directions than parallel to or at right angles to the elongated support, the marking points will partake of the motion of tracer point in accordance with the amount of each of these directions as components in the particular direction in which the tracer point is moved.

In order to properly transform a circle traced by tracer point 19 to an ellipse as reproduced by marking point 21, the marking point 21 must follow the tracer point 19 exactly as to all dimensions along lines parallel to the elongated support 5, but as to all lines perpendicular to elongated support 5, in order to make an isometric perspective, the ratio between the actual length of the lines traced by 19 and the lines marked by 21, would be in the ratio of 1 to 0.577. If another form of axonometric drawings is required then the position of the marking point along the line between pivot 15 and tracer 19 must be adjusted to give the proper ratio of reduction.

The method of pivotally connecting two members is well illustrated by Fig. 2 in which 14 is connected to 24 by a pivot 81. The link 14 is shown as a pipe and an elliptical portion 53 is removed from the wall thereof and the end of the member 24 is bifurcated as at 54 and each end pierced and held by a rivet 81, which is passed through the wall of link 14, both above and below the member 24.

The tracer 19 is best held by passing through a member 55 on the end of extension link 27. The tracer 19 may have a spool-like member 56 attached to it, as by screw 57. The end 55 may sweep upwardly as at 58 and terminate in a finger piece 59. If a coiled spring 60 is positioned between a flange 61 on tracer or stylus 19 and the terminal block 55, then the marking point 21 may be so positioned that it will not be in the same plane as the tracer point 19 when all parts are as shown in Fig. 1, but if the fingers of the hand of the operator grasp 56 and the thumb depresses finger piece 59 against the tension of 60 then the entire linkage will be moved toward the table top 21 and the marker 21 will be brought to position where it will mark upon any surface placed beneath and attached to table top 1. It should also be noted that if the finger piece 59 is not depressed, tracer 19 may preliminarily follow lines on the orthographic projection without causing marker 21 to mark, that is, tracer 19 may be manipulated without causing any effective operation of pencil 21. In the case of a circle on the orthographic projection which is to be traced, it would be well to position a device such as 82 by a thumb tack as 83 at the center of the circle to be traced and then the tracer 19 placed in such position on the member 82 that when swept about the center 82 it will properly follow the circle.

A convenient holder 23 for marker 21 is well shown in Fig. 4 in which a member 23 is provided with a cut-away portion 62 to fit the body of the marker 21 and the marker is held to 23 by the cap 63 held in place by screws as 64 and 65.

As it may be desirable to clear the table top 1 for the use of other kinds of drafting instruments, the entire linkage, including member 6, may be rotated on support 5 so that it will lie down back of the drawing board as best shown in Fig. 9.

The apparatus as hereinbefore described is ample for the purpose of making ellipses as isometric projections of orthographic projections. In order to more conveniently make an isometric view, it is desirable to have a means for moving the drawing surface relatively to the orthographic view.

My preferred way of moving the surface upon which the lines are made, relatively to the surface upon which the orthographic view appears, is to support a sheet material on table top 1 and provide apparatus by which it may be moved perpendicular to the elongated support 5.

My preferred form is a sheet 66 of any suitable or appropriate material such as non-stretchable linen which will lie flat and closely adjacent the table top 1 and to which a sheet for receiving a drawing may be readily attached by any other proper and usual method of attaching a drawing sheet to a flat surface, as by adhesively applying the drawing sheet or arranging the drawing sheet by Scotch tape or the like.

I prefer to have the sheet 66 in the form somewhat of an ordinary window shade and passing around a roller 68 best shown in Fig. 8, mounted in brackets as 69 just as is the usual spring shade roller, except that I do away with or do not use the usual pawl.

My construction of sheet 66 and roller 68 is such that a constant tension is on the sheet 66 to pull it upwardly toward elongated support 5. I resist this in my preferred form by means of a cord or string 70 attached to the lower end of 66 and secured at the lower end of the table top 1 in any suitable or convenient manner, but preferably by means of a clamp 71 best shown in Fig. 10. This clamp has a raised portion 72 which defines a groove 73 in which the cord 70 is placed. The cord then issues through the through orifice 74 and then passes beneath a spring leaf 75. The groove 73 guides the string 70 in a straight line at a right angle to the elongated support 5 and the spring leaf 75 holds the cord 70 in adjusted position so that one may easily manipulate the cord 70 to adjust the sheet 66 to any desired position.

When making an isometric drawing from orthographic views, after one section is shown isometrically by a marking made by marking point 21, the next isometric section must be displaced therefrom. This is accomplished by moving the sheet 66 the desired amount. This desired amount may be regulated by having a suitable registration mark 76 on sheet 66 to move along and cooperate with mark 77 fixed with respect to the orthographic projection on the sheet 78 attached to the table top 1. The several marks 77 may be placed in position so that when 76 is placed in registry with each in turn, the sheet 66 will be moved the proper distance for each of the several sections that make up the axonometric or isometric view. In the case of an isometric view, the actual distance on the orthographic view to the distance on the isometric view in the ratio of 1 to 0.816.

From the hereinbefore given description it will be understood that I have provided a device which may be used as an ellipsograph or may be used to produce the ellipses of an axonometric view such as an isometric view, and, of course, if the stylus or tracer, such as 19, is moved along right lines in the orthographic view, the same lines will be reproduced properly to make an isometric view.

Of course, in using applicant's device for producing an axonometric drawing, the lines corresponding to horizontal and vertical lines in the orthographic view will be placed at a proper angle, such as an angle of 45°, in case an isometric view is being made, to a line parallel to the elongated support 5.

Although I have particularly described one preferred physical embodiment of my invention and a modification thereof, nevertheless, I desire to have it understood that the form selected is merely illustrative, but does not exhaust the possible physical embodiments of the idea of means underlying my invention.

What I claim as new and desire to secure by Letters Patent is:

1. A device for transmitting motion, including, in combination, an elongated support, a member positioned on and movable along and guided by said support, a first link extending from and pivoted on said member, a second link extending from and pivoted on said member, a third link connecting the free portions of said first two links and pivoted to each and having an extension thereof beyond the second mentioned link, a tracer point attached to said extension of said third mentioned link, the dimensions of said links being such that when said first and second mentioned links are parallel to each other and to the said elongated support, the third said link is at a right angle to each of the first and second mentioned links and the elongated support, the ratio of lengths of said links being, 12 units for the said first link, 24 units for the said second link, and 9 units for the said third link, and 8.25 units for the said extension, said tracer point when moved independently of any movement of said member moving in a substantially straight line perpendicular to said elongated support, said tracer point also movable in a line parallel to said elongated support by a movement of said member along said support, said tracer point also movable by any combination of the said two movements, a marking point, means for supporting and connecting said marking point with said tracer point so that it partakes equally with the tracer point of the movement parallel to the elongated support but only a predetermined ratio of the movement perpendicular to said elongated support.

2. A device for transmitting motion, including, in combination, an elongated support, a member positioned on and movable along and guided by said support, a first link extending from and pivoted on said member, a second link extending from and pivoted on said member, a third link connecting the free portions of said first two links and pivoted to each and having an extension thereof beyond the second mentioned link, a tracer point attached to said extension of said third mentioned link, the dimensions of said links being such that when said first and second mentioned links are parallel to each other and to the said elongated support, the third said link is at a right angle to each of the first and second mentioned links and the elongated support, the ratio of lengths of the said links being, 12 units for the said first link, 24 units for the said second link and 9 units for the said third link, and 8.25 units for the said extension, said tracer point when moved independently of any movement of said member moving in a substantially straight line perpendicular to said elongated support, said tracer point also movable in a line parallel to said elongated support by movement of said member along said support, and said tracer point also movable by any combination of the said two movements, a marking point, a link supporting the marking point, said last mentioned link pivotally connected to said second mentioned link and also connected at a point separated from its connection with the second mentioned link to a pivot point on the said member, said marking point being positioned when the third said link is perpendicular to the said elongated support in the line drawn from the tracer point to the pivot point of the second mentioned link.

3. An elongated support, a member supported by the elongated support, a first rod pivoted on said member, a second rod pivoted on said member; a third rod pivoted to both the first and second rods, the dimensions of said rods being such that when said first two rods are parallel to said elongated support, a perpendicular from said second rod to the pivot of the first rod with the said member makes with a line drawn through the pivots of the first and second rods with the said member and a line along the second rod a right angle triangle, the said perpendicular, the portion of the second rod beyond the intersection of the perpendicular with the second named rod, the first named and the third named rod forming a parallelogram, an extension of said third named rod extending beyond its pivot with the second named rod and having a tracer point attached thereto, a fourth rod pivoted to the extension of said third rod and parallel to said second named rod, a marking point, a support for said marking point, said support being a rod pivoted to said second named rod and also the said fourth rod, said marker point lying in a line from said tracer point to the pivot of said second named rod with said member, whereby movement of the tracer parallel to said elongated support moves the marker point also parallel thereto and equally, movement of the tracer point perpendicular to the elongated support moves the marker point perpendicular to said elongated support, and movement of the tracer point at any other angle to the elongated support moves the marker point in proportion to the components of the two movements first mentioned.

4. A reproducing device, including, in combination, an elongated support, means carried by the support movable bodily along the support, a first pivot on the means, a second pivot on the means, links, one pivoted to each pivot and extending in the same direction from the means, a third link pivotally connecting the first two mentioned links, said third link including an extension extending beyond the pivot point between the second and third links, a tracer carried by the said extension, additional links forming with the link pivoted to the second pivot and the third link, a pantograph parallelogram, an extension carried by one of said additional links and a marking point carried by said last named extension whereby the marking point is actuated by movement of the tracer.

HOWARD M. EDMUNDS.

REFERENCES CITED

The following references are of record in the file of this patent:

UNITED STATES PATENTS

| Number | Name | Date |
|---|---|---|
| 406,083 | Brix | July 2, 1889 |
| 1,484,702 | Dowling | Feb. 26, 1924 |
| 1,496,889 | Kay | June 10, 1924 |
| 1,934,952 | Shoemaker | Nov. 14, 1933 |
| 2,015,368 | Ryan | Sept. 24, 1935 |
| 2,415,283 | Hobson | Feb. 4, 1947 |
| 2,553,026 | Williams et al. | May 15, 1951 |
| 2,559,222 | Moore | July 3, 1951 |